US010263494B2

(12) United States Patent
Spencer et al.

(10) Patent No.: US 10,263,494 B2
(45) Date of Patent: Apr. 16, 2019

(54) DEVICE FOR CONVERTING KINETIC ENERGY TO ELECTRICAL ENERGY

(71) Applicant: SPENCER COMPOSITES CORPORATION, Sacramento, CA (US)

(72) Inventors: Brian E. Spencer, Sacramento, CA (US); Zachary B. Spencer, Sacramento, CA (US); Andrew Harlan Weisberg, San Francisco, CA (US); Gary W. Raff, Sacramento, CA (US)

(73) Assignee: Spencer Composites Corporation, Sacramento, CA (US)

( * ) Notice: Subject to any disclaimer, the term of this patent is extended or adjusted under 35 U.S.C. 154(b) by 140 days.

(21) Appl. No.: 15/040,766

(22) Filed: Feb. 10, 2016

(65) Prior Publication Data

US 2017/0063198 A1 Mar. 2, 2017

Related U.S. Application Data

(60) Provisional application No. 62/210,889, filed on Aug. 27, 2015.

(51) Int. Cl.
| | |
|---|---|
| *H02K 7/00* | (2006.01) |
| *H02K 7/18* | (2006.01) |
| *F03G 5/06* | (2006.01) |
| *H02J 7/34* | (2006.01) |
| *H02K 7/06* | (2006.01) |

(52) U.S. Cl.
CPC .............. *H02K 7/1853* (2013.01); *F03G 5/06* (2013.01); *H02J 7/345* (2013.01); *H02K 7/06* (2013.01)

(58) Field of Classification Search
CPC .... F03G 5/00; F03G 5/06; F03G 5/08; H02K 7/1853; H02K 7/06
USPC ........ 290/1 R, 1 C; 185/33, 29, 27, 32, 3, 9, 185/10, 19, 17, 39, 12
See application file for complete search history.

(56) References Cited

U.S. PATENT DOCUMENTS

| | | | | |
|---|---|---|---|---|
| 675,497 | A * | 6/1901 | Pollock | F03G 3/00 185/33 |
| 996,147 | A * | 6/1911 | Shanton | F03G 1/00 185/10 |
| 3,268,845 | A * | 8/1966 | Whitmore | A61B 5/1135 338/38 |
| 3,342,998 | A * | 9/1967 | Anderson | H02K 7/1853 102/207 |
| 4,245,640 | A * | 1/1981 | Hunt | A61N 1/3785 607/33 |
| 4,961,573 | A * | 10/1990 | Wehrell | A63B 21/0552 482/124 |
| 5,358,461 | A * | 10/1994 | Bailey, Jr. | A63B 21/0053 290/1 R |
| 5,733,231 | A * | 3/1998 | Corn | A63B 21/025 482/120 |

(Continued)

OTHER PUBLICATIONS

International Search Report and Written Opinion dated Nov. 7, 2016 in International Patent Application No. PCT/US2016/048971, 8 pages.

*Primary Examiner* — Julio C. Gonzalez
(74) *Attorney, Agent, or Firm* — Squire Patton Boggs (US) LLP

(57) ABSTRACT

The invention disclosed herein is directed to a device for converting kinetic energy generated by a living organism in motion to electrical energy.

18 Claims, 13 Drawing Sheets

(56) References Cited

U.S. PATENT DOCUMENTS

| | | | | |
|---|---|---|---|---|
| 6,461,307 B1* | 10/2002 | Kristbjarnarson | ... | A61B 5/1135 600/529 |
| 6,691,318 B1* | 2/2004 | Davis | ................ | A63B 21/0004 2/102 |
| 7,163,239 B2* | 1/2007 | Fisher | .................... | E05B 81/14 185/37 |
| 7,402,147 B1* | 7/2008 | Allen | .................... | A61F 5/0125 602/19 |
| 7,989,970 B2* | 8/2011 | Yeh | ........................... | B62J 1/06 180/207.1 |
| 8,723,342 B2* | 5/2014 | Kozinsky | .................. | F03G 7/08 290/1 R |
| 9,362,803 B2* | 6/2016 | Panousis | ............. | H02K 7/1853 |
| 2003/0056599 A1 | 3/2003 | van Schoor et al. | | |
| 2005/0072635 A1* | 4/2005 | Toti | ........................ | E06B 9/262 185/10 |
| 2005/0087394 A1* | 4/2005 | Toti | ........................ | E06B 9/322 185/37 |
| 2009/0243303 A1* | 10/2009 | Yeh | ..................... | H02K 7/1853 290/1 A |
| 2012/0248784 A1* | 10/2012 | Seike | .................... | H01M 10/46 290/1 R |
| 2013/0099506 A1* | 4/2013 | Miyake | ................. | A01K 25/00 290/1 R |
| 2014/0081166 A1* | 3/2014 | Lang | .................... | A61B 5/1135 600/534 |

\* cited by examiner

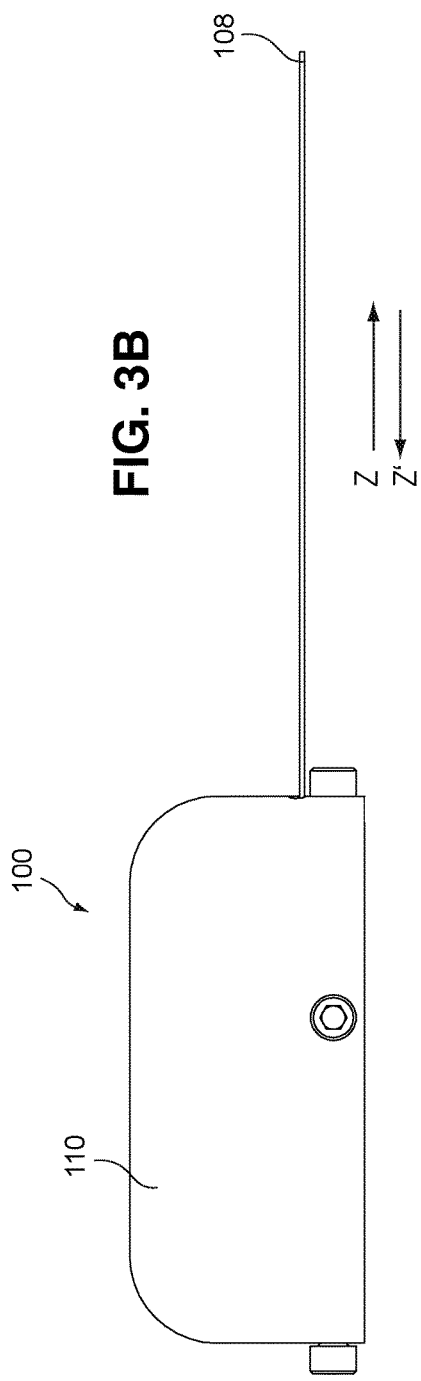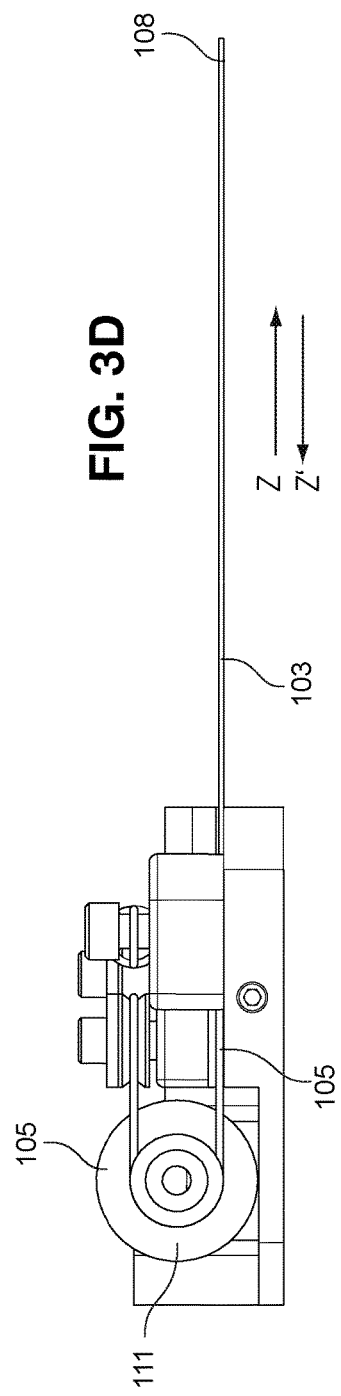

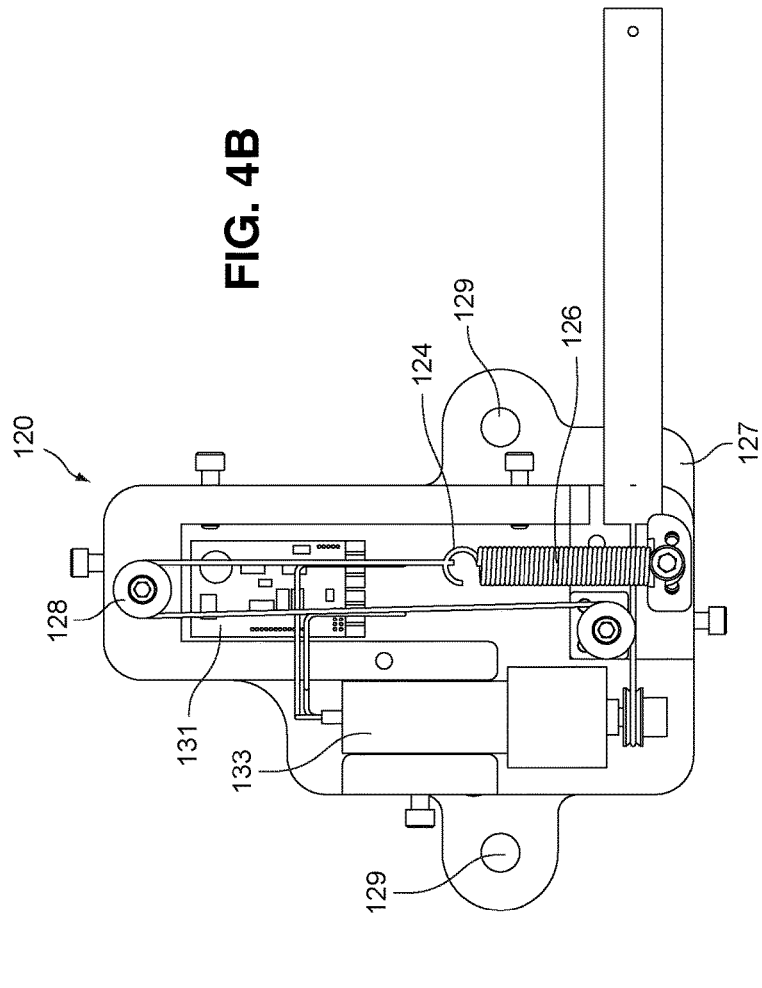
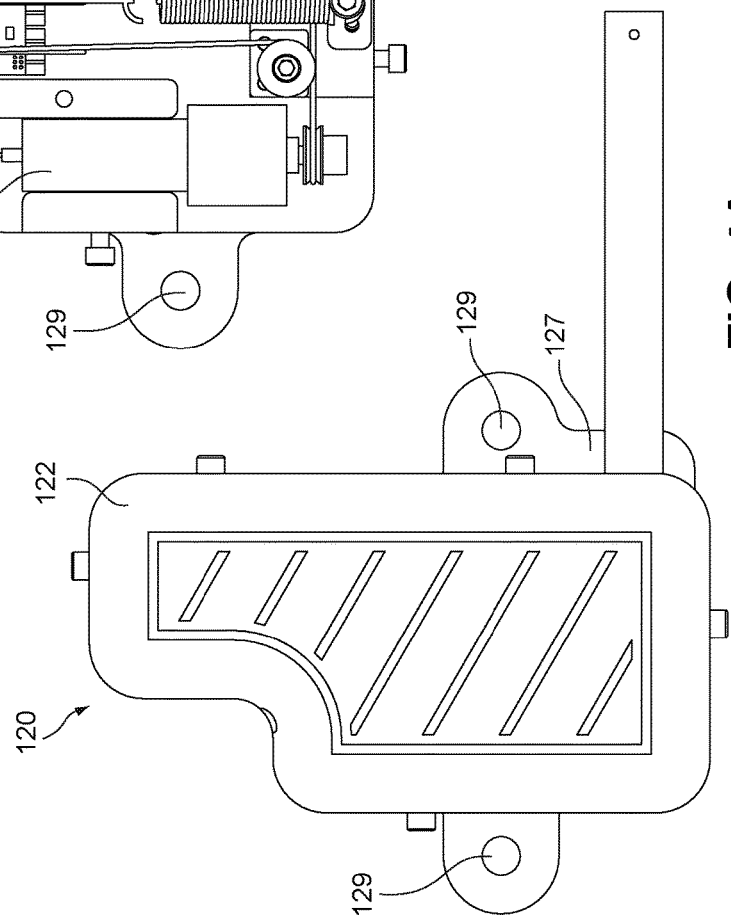
FIG. 4B
FIG. 4A

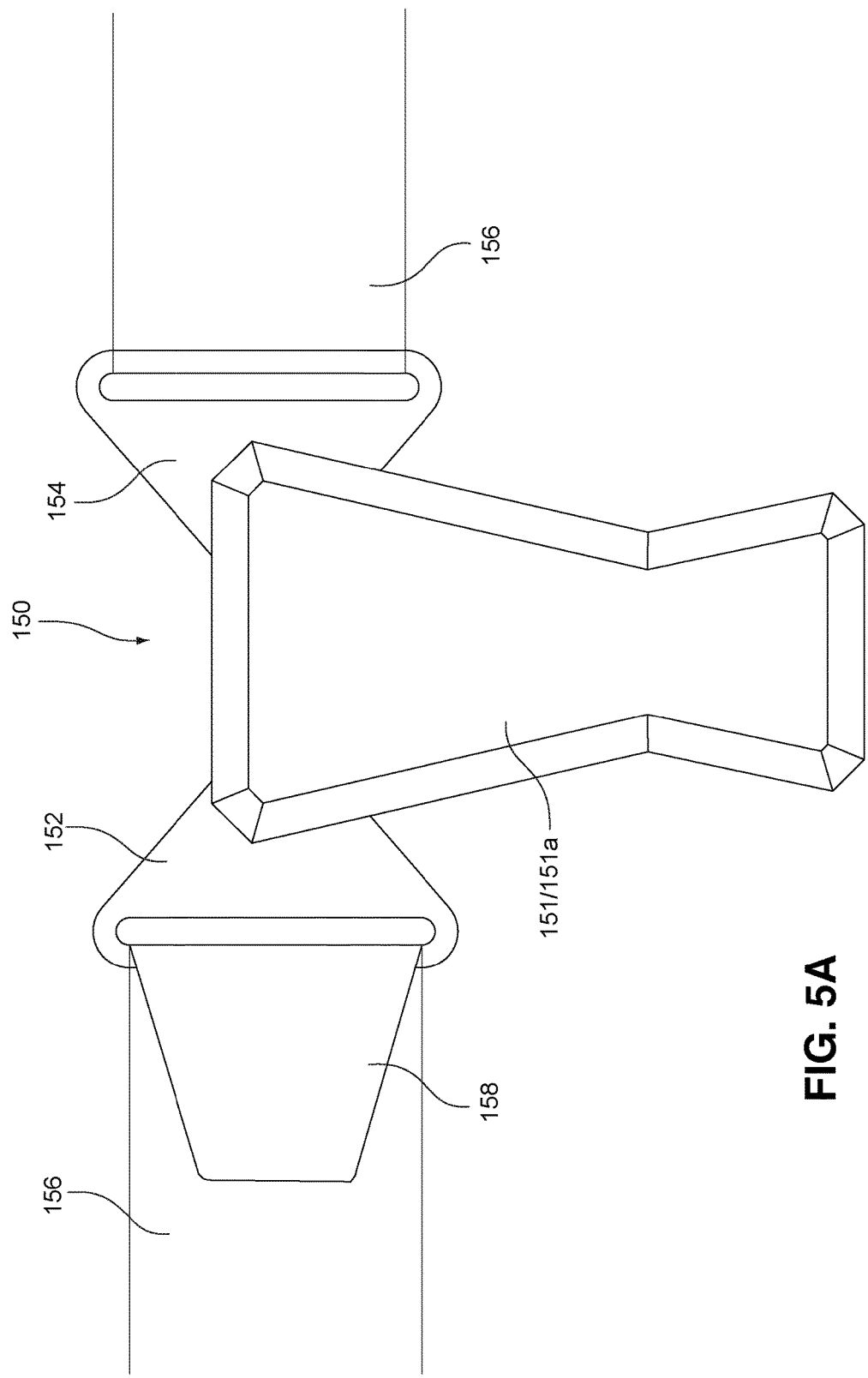

DEVICE FOR CONVERTING KINETIC ENERGY TO ELECTRICAL ENERGY

RELATED APPLICATIONS

This application claims the benefit of provisional patent application Ser. No. 62/210,889, filed on 27 Aug. 2015, which is incorporated by reference as if fully set forth herein.

FIELD

This invention relates to mechanical devices for converting kinetic energy to electrical energy for powering battery-operated devices.

BACKGROUND

The following is provided as background information only. Nothing in this section is intended to be, nor should it be construed as, prior art to the subject invention.

Battery-powered devices have become ubiquitous in present day life. Anything from heart pacemakers to automobiles can be powered by batteries. While battery power removes the previously limiting tether to a stationary power source, battery power does come with inherent limitations. Their useful lifespan is limited and, as is quite well known to virtually everyone, batteries have a tendency to die at the most inopportune moments. Stories abound relating to hikers whose GPS's quit during a trek and about cell phones that give out when a person has had an accident or is stranded somewhere for some reason or another. In addition, although great stride have been made, batteries still weigh a significant amount, in particular in situations where back-up batteries must be carried to ensure continuous operation of crucial devices. Military uses, of course, come immediately to mind. It has been estimated that the weight of batteries alone that current day combat troops carry into battle can account for upwards of 30% of the total weight of the gear being carried. The effort required to carry such heavy loads have been shown to have marked detrimental effect on soldiers' ability to perform when called upon to do so. The problem is so serious that DARPA attempted to assuage the problem by issuing combat boots with piezoelectric devices in the sole of the boot, the idea being to generate a watt or two from the simple expedient of walking, which soldiers do a lot. The boots, however, proved so impractical and uncomfortable due to the added expenditure of energy to operate the device that the project was abandoned.

What is needed is a reliable, very light weight, virtually fail-safe device for powering devices as a complete substitute for batteries or as a extender of battery life to reduce or eliminate the need for backup batteries. The present invention provides such a device and method.

SUMMARY

Thus, in one aspect, the present invention is directed to a device for converting kinetic energy to electrical energy, comprising:
  a support member;
  an electrical generator operatively coupled to the support member;
  an actuator member operatively coupled to the electrical generator;
  a spring operatively coupled to the actuator member and to the support member;
  a flexible non-elastic strap having a proximal end and a distal end, the proximal end being operatively coupled to the actuator member and the distal end being operatively coupled to the support member; wherein
  the flexible non-elastic strap fits snugly around the expandable/contractable element of a living organism when in the contracted state.

In an aspect of this invention, the device further comprises a protective case.

In as aspect of this invention, the elongate actuator is rigid.

In an aspect of this invention, the elongate actuator is flexible but non-elastic.

In an aspect of this invention, the device comprises one or more power outlet ports.

In an aspect of this invention one or more of the power outlet ports comprises(s) USB ports.

In an aspect of this invention, the living organism comprises a mammal.

In an aspect of this invention, the mammal is a human being.

In an aspect of this invention, the expandable/contractable portion of the human being is the chest.

In an aspect of this invention, a resistance of about 1 lb to about 10 lbs. is generated at the chest at full expansion of the device due to subject inspiration.

In an aspect of this invention, the proximal end of the actuator is operatively coupled to the electrical generator by a system comprising a gear assembly.

In an aspect of this invention, the proximal end of the actuator is operatively coupled to the electrical generator by a system of pulleys and a cable.

In an aspect of this invention, the electrical generator is electrically coupled to an on-board capacitor.

In an aspect of this invention, the electrical generator is electrically coupled to an onboard battery.

In an aspect of this invention, the device comprises two or more individual devices coupled together either in parallel or in series.

In an aspect of this invention, a device of this invention may comprise two or more electrical generators coupled to one device.

DETAILED DESCRIPTION

Brief Description of the Drawings

The figures are provided for illustrative purposes only to assist in understanding the invention herein and are not intended nor should they be construed as limiting the scope of this invention in any manner. The figures are not necessarily to scale. The use of the same element identification number in different drawings means that that element is the same in those drawings.

FIG. 3B is a side view of the device of FIG. 3A.

FIG. 3D is a side view of the device of FIG. 3A with the protective case removed.

FIG. 4A is a top view of another embodiment of a device of this invention with its protective case in place.

FIG. 4B is a top view of the device of FIG. 4A with the protective cover removed.

FIG. 5A is a front view of yet another embodiment of a device of this invention with a protective cover in place.

DISCUSSION

Figure 1A:
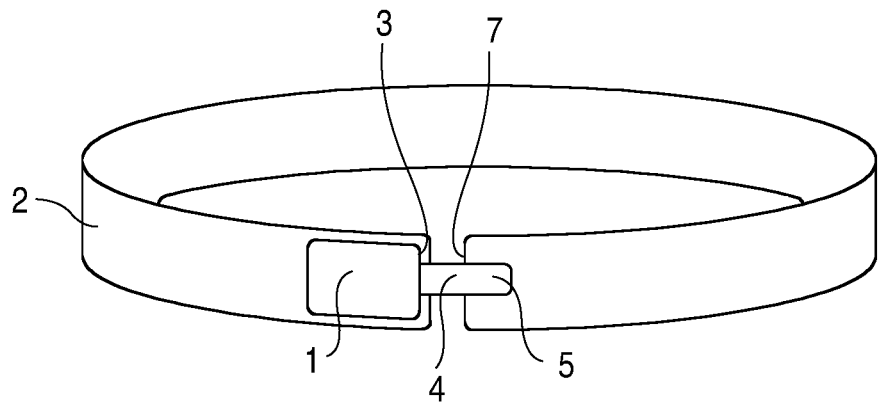
FIG. 1A is a schematic diagram of a device of this invention attached to a band that can be worn around the chest of a wearer/operator. The device is shown as it would look when the wearer/operator's chest is deflated, that is, the wearer operator has exhaled.

It is understood that, with regard to this description and the appended claims, any reference to any aspect of this invention made in the singular includes the plural and vice versa unless it is expressly stated or unambiguously clear from the context that such is not intended. Thus, for instance, reference in the singular to an electrical generator refers to one of more generators situated similarly to the generator described in the claim.

As used herein, any term of approximation such as, without limitation, near, about, approximately, substantially, essentially and the like means that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the term of approximation. In general, but with the preceding discussion in mind, a numerical value herein that is modified by a word of approximation may vary from the stated value by ±15%, unless expressly stated otherwise.

As used herein, the use of "preferred," "presently preferred," "More preferred," "preferably," and the like refers to preferences as they exist at the time of filing of this application.

The discussion that follows relates specifically to an embodiment of this invention in which a device of this invention is worn on the chest of a wearer/operator and operated by the involuntary act of breathing, which causes the chest to expand and contract and thereby causes the actuator of the device to move. It is understood, however, that a device of this invention may be used with any body part that expands and contracts, either voluntarily or involuntarily, such as, without limitation, a leg muscle, an arm muscle, even, under the right set of conditions including but not limited to the size of the device, an organ such as a lung or the heart per se. Of course, a device of this invention may be used with any living organism that comprises an element that expands and contracts sufficiently to operate the device. Implementation of step-up elements such as, without limitation, step-up gearing would permit very small movement of an expandable/contractable element of a living organism to be translated into useable amounts of electricity.

As used herein, the term "on-board" means that the element that is disclosed as being on-board is part of the device itself and is operatively coupled to the support member and may, but need not necessarily, be included within the protective cover of the device.

As used herein, "operatively coupled" refers to a member of a device herein where a member is either directly connected to another member or is connected to the other member through one or more intervening members. The connections may independently be static, that is the connected members do not change position with regard to one another or the connections may be dynamic, that is, the connected members change position with regard to one another, Such a dynamic connection may occur when the connected elements are each moveably coupled to and rotate about a central shaft or axle.

As used herein, a "support member" refers to a base to which other members of a device may be operationally coupled. In particular, in context of this invention, "support member" refers to a member to which an electrical generator of this invention is coupled, directly or operationally. A support member may be constructed of any manner of material such as, without limitation, wood or a wood product such as, without limitation, fiberboard, a metal or metal alloy such as without limitation, iron, steel, stainless steel, copper, zinc, aluminum or alloys thereof, a polymer or a polymer composite. Presently preferred are light weight but strong materials such as aluminum or aluminum alloy and polymeric composites.

As used herein, an "electrical generator" refers to a device that, when certain elements of the device are put in motion by applied kinetic energy, electricity is produced by the generator. Such electrical generators are well known to those, skilled in the art and need no further description herein.

As used herein, an "actuator" refers to an element of a device herein wherein movement in the actuator results ultimately in movement of the elements of an electrical generator as discussed above that result in the production of electricity. Thus, movement of the actuator ultimately results in the production of electricity.

As used herein, a "flexible, non-elastic strap" refers to an elongate band of material that can be fit snugly around the portion of an organism, which portion is involved in voluntary or involuntary expansion and contraction, when the portion is in its contracted state. Then, when the portion expands, the strap pulls on the actuator, which in turn causes the rotor of the electrical generator to rotate and, in conjunction with, without limitation, a stator, an armature, a commutator and the like, to create electricity. The strap may be constructed of any material that has the dual characteristics of flexibility and non-elasticity such as, without limitation, leather, a fabric, a polymer or a polymer composite. The strap may be operatively coupled to the actuator member or the support member or both by an adjustable closure member, which may be manipulated to assure the required snug fit around the expandable/contractable element of the living organism or one of the operative couplings may be such and the other may comprise a permanent coupling. As used herein, the term "flexible non-elastic band" is synonymous with flexible non-elastic strap" and the terms are used interchangeably herein.

As used herein, the phrase "fits snugly" as applied to the positioning of a flexible non-elastic strap of this invention around the expandable/contractable element of a living organism means that the strap is fitted so as to not uncomfortably restrict the expansion/contraction of the portion of the living organism but, at the same time, is sufficiently tightly fitted to the living organism that essentially any expansion of the portion of the living organism results in movement of the actuator and thus the production of electricity.

As used herein, the phrase "rotatably coupled" means that the element that is rotatably coupled to another element, e.g. an actuator rotatably coupled to axle, means that the first element freely rotates about the second element. For example, without limitation, the actuator comprise a hole through which the axle is inserted such that the actuator is capable of rotating on the axle without any movement of the axle.

The present invention is directed to the conversion of kinetic energy in the form of body motion into electrical energy sufficient to operate a host of small electrical devices. Particularly useful is the expansion and compression of the chest of a mammal due to breathing because breathing is an involuntary function controlled by the autonomic nervous system. While obvious cessation is breathing due to holding one's breath is possible, in general, to remain alive an animal must breath. While a multitude of animals might be recruited to wear a device of this invention and thereby generate electricity, the primary thrust of this invention at this time is the involuntary movement of human torso, primarily the chest. At maximal inspiration, the chest of a human can expand from about 1 inch to about 5 inches. Normal respiration rate in humans varies from about 18 to about 28 breadths per minute. Thus, if a spring were to be attached to the two ends of a flexible non-elastic band disposed around the chest of a person, one end of the spring will have move a total of about 18 inches to about 140 inches per minute in one direction and, if the return of the spring to its resting state is taken into account, the end of the spring will have moved from about 36" to about 280" or about 3 to almost 24 linear feet in just one minute. Depending on the resistance of the spring to movement, a substantial amount of work can be done per minute by a person simply breathing. It is the propose of this invention to take advantage of this otherwise wasted work to generate electrical energy, preferably at present DC electrical energy although, as will be seen, there is no reason to limit the electrical energy in this manner; simply exchanging an alternator for the generator of the present invention should constitute a ready source of AC electrical energy.

A device of this invention will be capable of generating sufficient DC energy to power a host of devices that normally depend on batteries for their operation. In some embodiments, the device herein can be used as the sole source of DC power to operate the device. In other embodiments, a device of this invention can be used as an auxiliary power source that could extend the utility of a rechargeable battery by recharging it on the go. A device herein may operate totally independently or it may include an on-board rechargeable battery that could act as the primary power source for a device or it may include an on-board condenser that could accumulate charge for later discharge as needed.

It is presently contemplated that devices such as, without limitation, medical devices, i.e., pacemakers, implantable drug delivery devices, etc.; cell phones; lap top computers, i-Pads®; tablets; flashlights; MP3 players, radios, robot controls, video cameras, such as, without limitation, the seemingly ubiquitous Go-Pro® camera; tactical weaponry, jewelry and the like.

A device herein would be small, light and generally relatively unobtrusive so that the wearer would not feel encumbered or embarrassed by its presence. Since the device would be operationally virtually totally mechanical in nature, it would be expected to be quite robust, that is able to withstand substantial adverse working conditions and still perform its designated function. This would be especially valuable to first responders such as, without limitation, fire fighters, peace officers, EMT personnel, hazmat personnel and the like for whom a reliable source of electrical energy to operate a multitude of critical gear is paramount. Of course, the aforesaid list would be woefully deficient if the military were not included. As mentioned previously, a modern soldier might carry upwards of 100 pounds of equipment on a combat mission. This far exceeds the desirable load, approximately 50 pounds that a combat soldier should carry according to military advisors charged with assessing such things. Of the 100 pounds, the weight of primary and back-up batteries might total from 20 to 35 pounds. Thus, reducing the battery load of soldiers could go a long way toward relieving the carry-load on soldiers and thereby enhance their effectiveness in battle.

It is anticipated that the device of this invention, minus the weight of the band to which it is attached, will have dimensions of about 1"-4" by 1"-4" by 0.5-1", possibly less as smaller and smaller components become available and weigh from about 25 to about 100 grams (0.7-3.5 ounces or 0.04-0.22 lb.), that is, smaller than a current smartphone. This could bring the load weight on soldiers down to about 65 to 80 pounds, a substantial step in the right direction. Of course, whether or not all batteries currently being carried by soldiers could be replaced remains a question. It is noted, however, that, given the dimensions, a soldier could wear several of the instant devices and carry several additional devices as backups at a weight cost of as little parallel or in series is an embodiment of this invention. The circuitry needed to accomplish such coupling is well-known to those skilled in the art and need not be described herein in any detail. It is also anticipated that the coupling of two or more electrical generators to the same device will provide a method of increasing the amount of electricity that can be generated by one device.

With regard to the DC power that can be generated using a device or several devices of this invention together, it is currently estimated that peak power output could reach approximately 1 kW if the device(s) is/are used by personnel in excellent physical condition and having the desire and need for such power, such as military personnel. For use by individuals of average physical capabilities, it should be possible to easily generate 10-200 milliwatts of power without the wearer/operator sensing any excess exertion. This would provide sufficient power to operate most current small devices such as, without limitation, cell phones, GPS devices, tablets, laptops, etc.

Figure 1B:
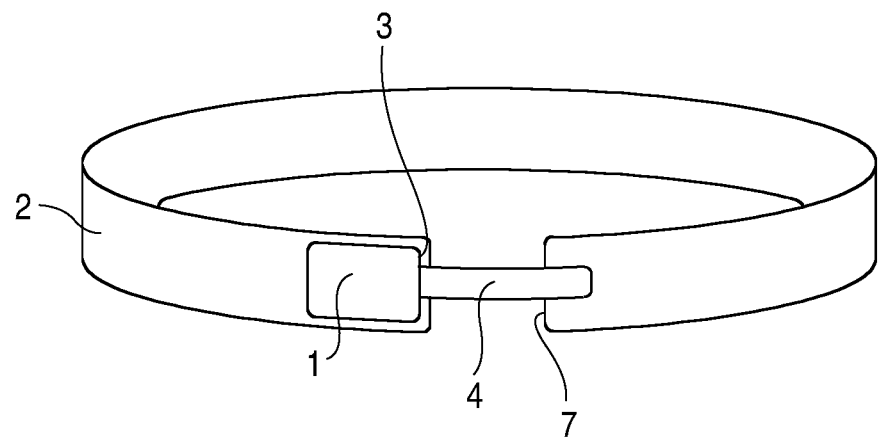
FIG. 1B shows the same schematic as FIG. 1A except that it is shown when the wearer/operator's chest is expanded, that is, the wearer/operator has inhaled.

FIG. 1 is a schematic of a device of this invention showing the invention encased in protective cover 1 and attached to flexible, non-elastic strap 2 at or near end 3 of strap 2. In FIG. 1A, the device is shown as it would appear when the chest of the wearer/operator is deflated, that is, the wearer/operator will have exhaled. Actuator 4 extends through a slit (not shown) in protective case 1. End 5 of actuator 4 is attached at or near end 7 of strap 2. Attachment of actuator 5 to end 7 of strap 2 comprises any type of coupling mechanism that ensures that actuator 4 is securely fastened in place. Examples of such coupling mechanisms include, without limitation, buckle and post, buttons, hook and eye, hook and loop (Velcro®) and snaps. Presently preferred is a Velcro® coupling since it is the simplest to fabricate in such a manner that a snug fit around the chest or other expandable/contractible body part can be readily achieved. FIG. 1B shows the same figure as FIG. 1A except that the wearer/operator's chest is expanded, that is, the wearer/operator will have inhaled. As can be seen, actuator 4 has been extended out of the device and in doing so, power is generated.

Figure 2A:
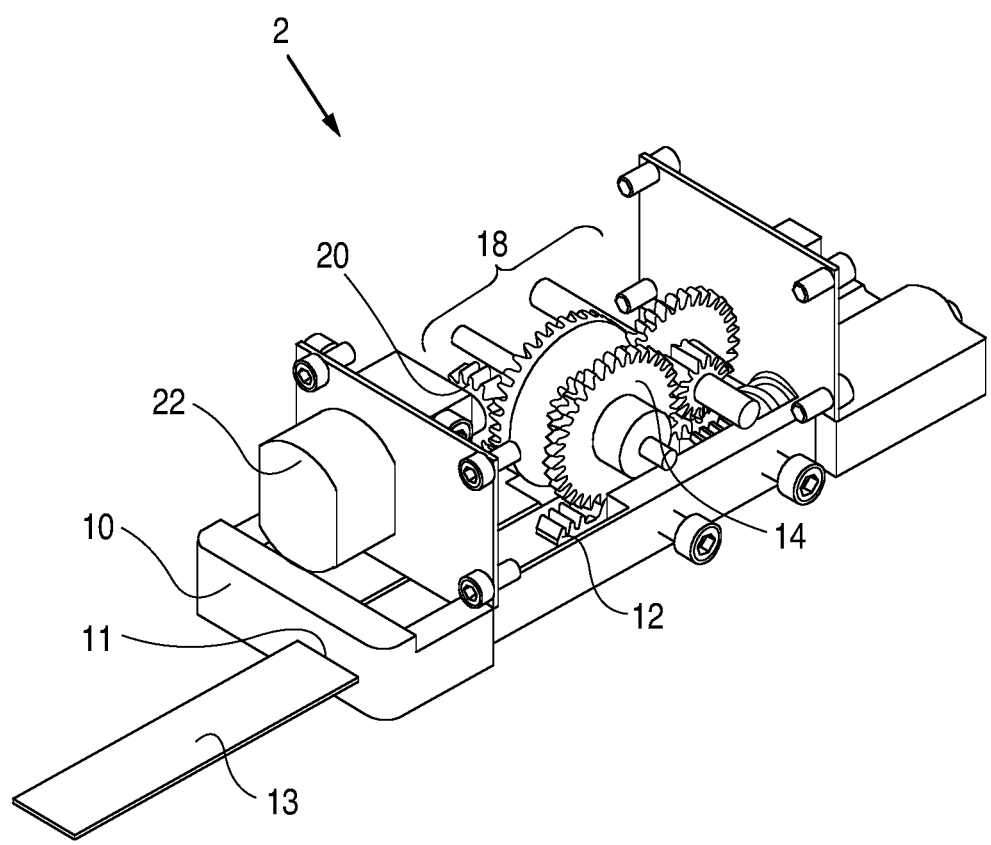
FIG. 2A is an isometric projection of a device of this invention with a protective case removed.
Figure 2B:
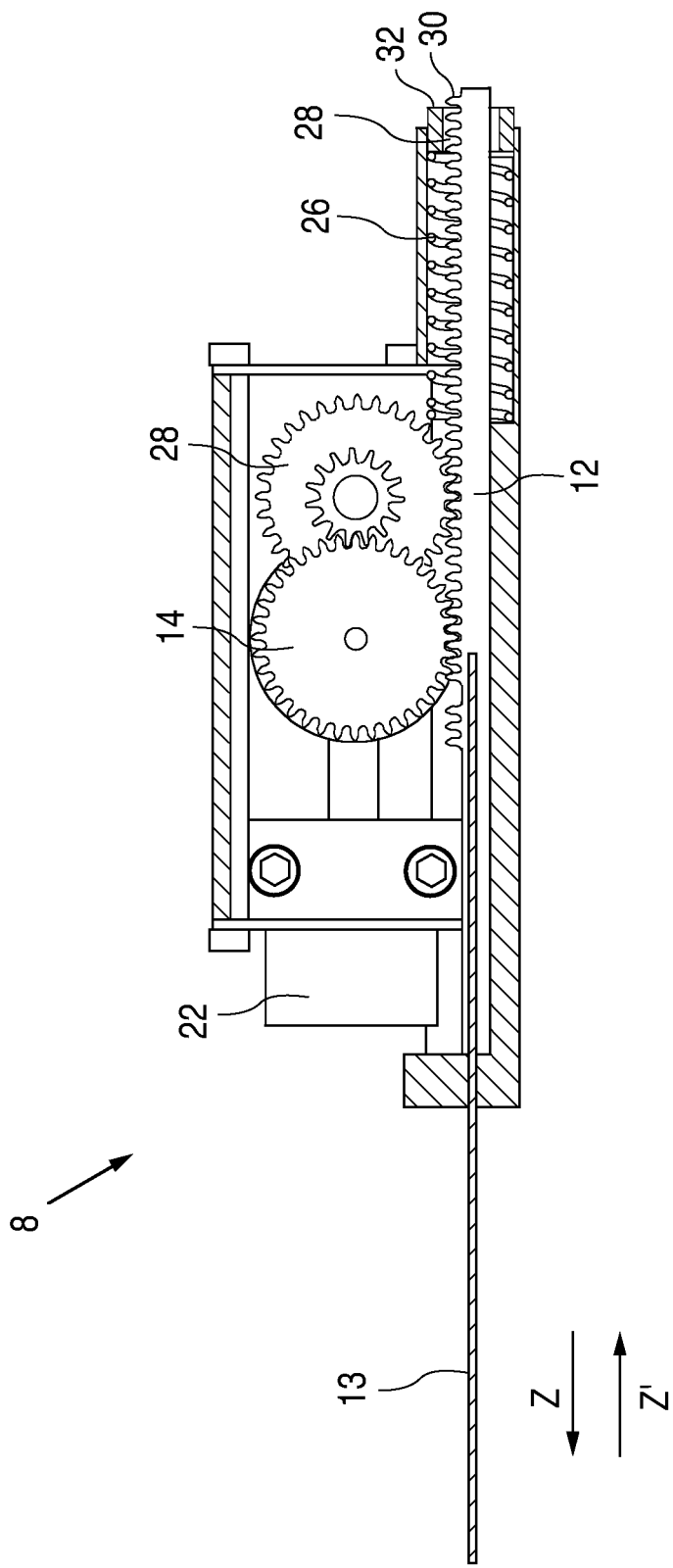
FIG. 2B is a side view of the device of FIG. 2A.

FIG. 2 shows device 8, an embodiment of this invention absent the carrier band. In FIG. 2A, 10 is a base plate on which all the operational elements of the device are disposed, directly or operationally. A protective cover, not shown, would be disposed over the entire mechanism. Rack 12 is coupled to actuator 13, which exits device 8 through slit 11 in base plate 10. Actuator 13, then is coupled to a free end of a carrier band to which based plate 10 is coupled. Pinion gear 14 transfers the linear motion of rack 12 to gear assembly 18. Gear assembly 18 eventually transfers the earlier motion to gear 20, which is coupled to electrical generator 22 and, operatively to its rotor (not shown). Electrical generator 22 is connected to the external environment by one or more paired sets of wires, not shown, which are then connected to whatever device(s) is/are being supplied with DC energy. The exact arrangement and size, in terms of number of teeth, on the gears of the gear assembly 18 are not expressly called out here because such gear arrangements are extremely well-known in the art and the skilled artisan would be readily able, based on the disclosure herein, to select the number of gears and the sizes of the gears to result in transfer of the exact distance that rack 12 moves to the distance in revolutions final gear 20 moves, which movement is then transferred to revolutions within generator 22. That same artisan could, in the alternative, select the number and size of gears in the gear assembly to step-up or step-down the number of revolutions of generator 22 compared to the linear distance moved by rack 12. The decision whether to maintain, step-up or step-down relationship between rack 12 movement and revolutions of generator 22 depends on several factors including, but not limited to, the amount of electricity desired from the generator and, in particular, the amount of kinetic energy that must be produced by the operator/wearer of the device to effect such revolutions and electricity generation. FIG. 2B is a side view of device 8 of FIG. 1A. In FIG. 2B, pinion gear 14 is coupled to rack 12 and to first gear 28 of gear assembly 18. Spring 26 is encased in longitudinal containment box 28, the spiral of spring 26 being engineered so as to engage the teeth 30 of rack 12. When actuator 13 is moved in direction z by the expansion of the operators' chest, the gears revolve and spring 26 is compressed against endplate 32 in spring containment box 28. When the wearer/operator expires and the chest contracts, spring 26 moves in direction z' returns to its original rest position and in doing so, causes rack 12 to move in direction z' also, back to its starting position. Generator 22 is selected such that electricity in produced when the rotor revolves in either direction. Thus, DC current is produced both when the wearer/operator is inhaling and when the wear/operator is exhaling.

Figure 3A:
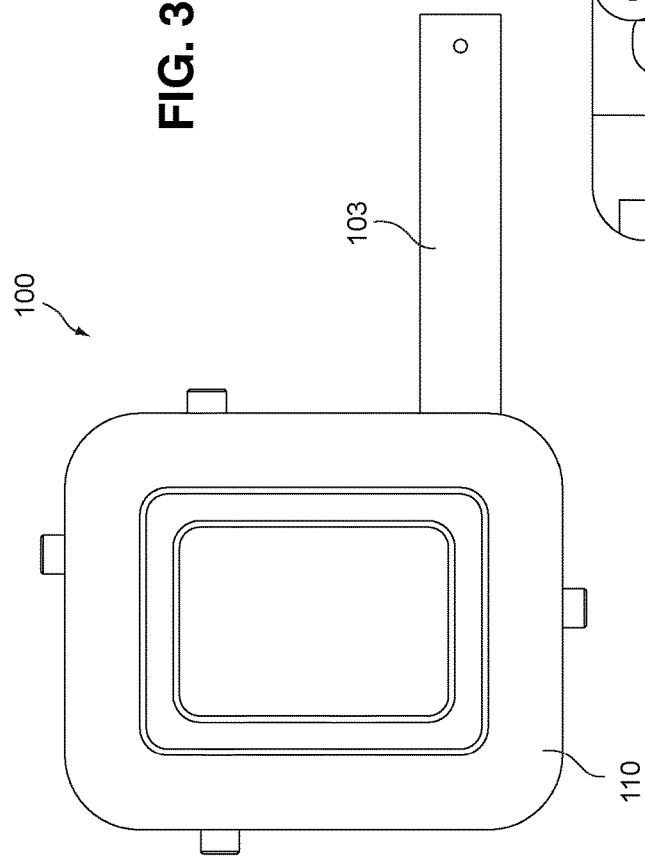
FIG. 3A is a top view of another embodiment of the device of this invention enclosed in its protective case.
Figure 3C:
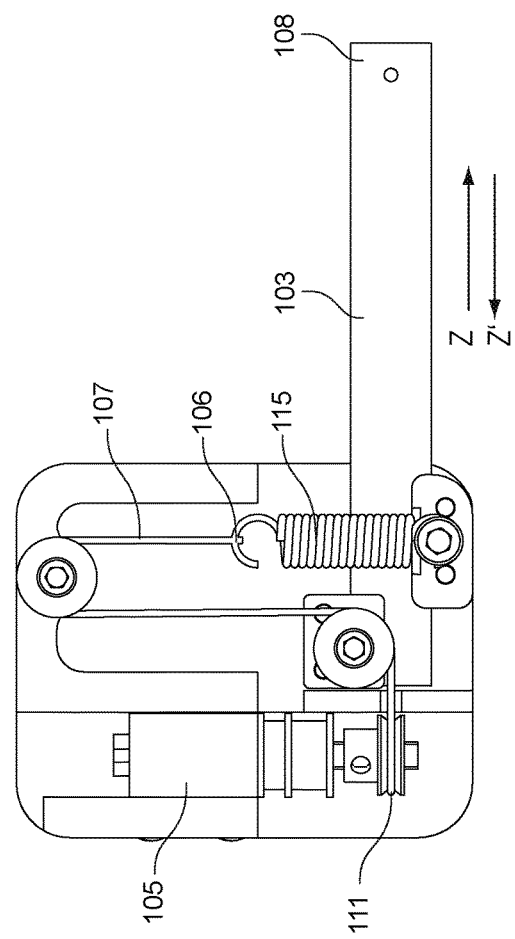
FIG. 3C is a top view of the device of FIG. 3A with the protective case removed.

FIG. 3 shows yet another embodiment of this invention. In FIG. 3A device 100 is shown still enclosed in protective case 110. Actuator 103 is shown exiting protective case 110 through an aperture (not shown). FIG. 3B is a side view of device 100 enclosed in protective case 110. FIG. 3C is a top view of the device with protective case 110 removed. In FIG. 3C actuator 103 is operatively coupled to electrical generator 105 by line 107. Line 107 can be, without limitation, a wire, a polymeric cord or a natural fiber cord, i.e. a common string. End 109 (FIG. 3C) of line 107 is coupled to actuator 103 while end 106 of line 107 is operatively coupled to spring 115. End 108 of actuator 103 can be modified depending on the type of coupling mechanism to an end of a band (as shown in FIG. 1) is selected. The size of pulley 111 determines whether the rotational movement of the rotor of electrical generator 105 is the same as the distance that actuator 103 moves when the wearer/operator inhales or whether it is stepped-up or stepped-down as these terms are described previously herein. FIG. 3D is a side view of device 100 showing the manner in which line 107 passes by pulley 111 and wends its way to coupling with spring 115, shown if FIG. 3C. As in the device of FIG. 2, generator 105 is capable of producing DC energy both when line 107 is moving in direction z and when it is moving in direction z', i.e., when spring 115 is extending and when it is returning to its rest state.

Figure 4C:
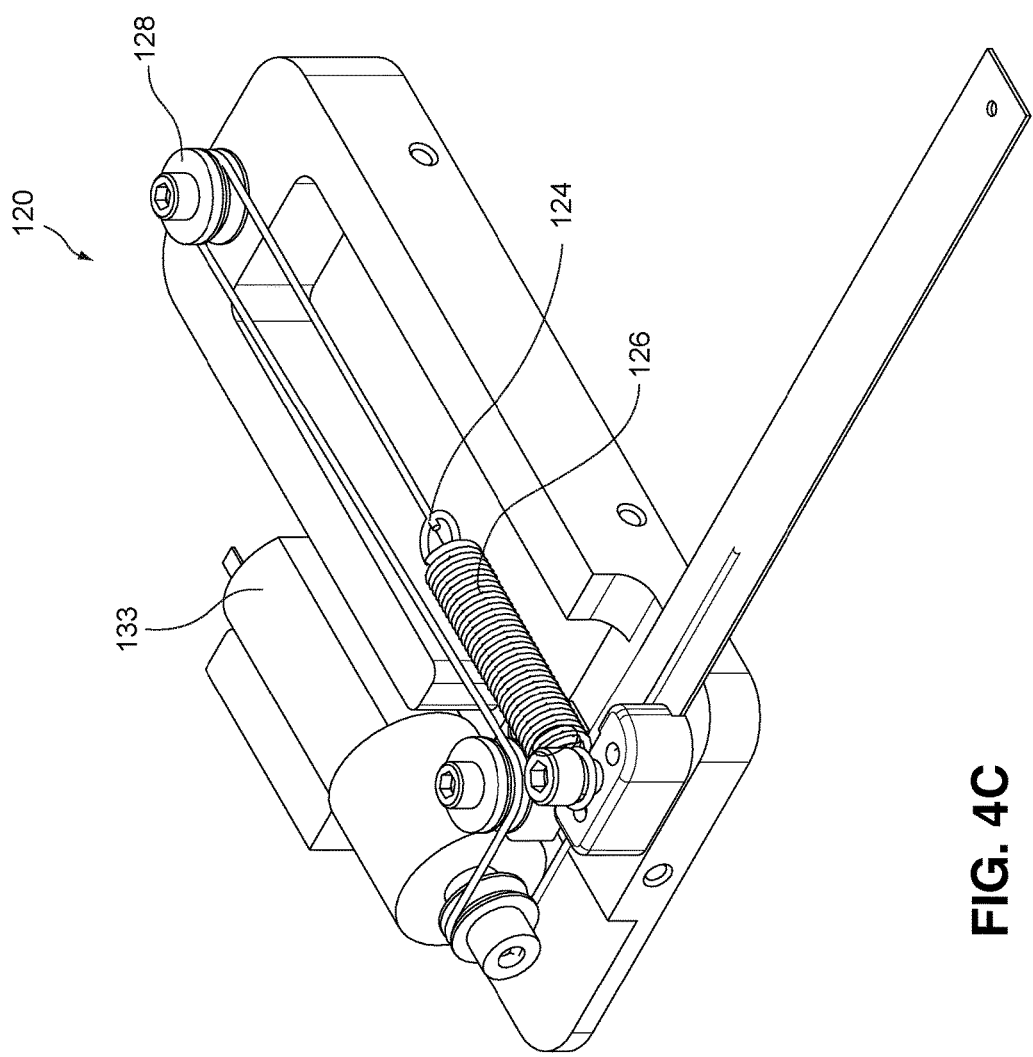
FIG. 4C is an isometric view of the device of FIG. 4A with the protective cover removed.

FIG. 4 illustrates another embodiment of this invention. FIG. 4A shows device 120 enclosed in protective case 122. FIG. 4B is a top view of device 120 with protective case 122 removed and FIG. 4C is an isometric view of device 120 with case 122 removed. The parts and the mechanism are essentially the same as those for the device of FIG. 3 except that the distance from end 124 of spring 126 to pulley 128 is farther than the distance between the corresponding parts of the device of FIG. 3. This permits spring 126 to extend further than the spring in FIG. 3, such that device 120 may be able to generate more DC power per wearer/operator inspiration than the device of FIG. 3. FIGS. 4A and 4B include base plate 127 that has through-holes 129, which may be used to couple the device to a band as shown in FIG. 1. In addition, FIG. 4B shows circuit board 131, which is coupled to generator 133 and is coupled to power outlet ports (not shown), located on the exterior of protective cover 122. The types and numbers of outlet ports can vary depending on the particular use of the device in question. Since USB ports are currently perhaps the most common connection between a power source and a powered device, it is presently preferred that at least one of the outlet ports of a device of this invention be a USB port. FIG. 4C is simply an isometric view of the device as shown in FIG. 4B. It is noted that a baseplate with through-holes, a circuit board and a discussion of power outlet ports are discussed only in conjunction with the device of FIG. 4. It is, however, understood that each of the embodiments of the current invention, as set forth in any or all of FIGS. 1, 2, 3, 4 and 5 can comprise the same or similar baseplates, circuit boards and outlet ports.

FIG. 5 illustrates another embodiment of this invention. FIG. 5A depicts device 150, with protective cover 151 in place. Protective cover 151 comprises two parts, front cover 151*a* and back cover 151*b* (not shown but see FIG. 5B). Protective cover 151 is coupled to the device by virtue of its being mounted on the same axle on which an actuator member and a support member are rotatably mounted (see FIGS. 5B, 5C and 5D). Support member operative coupling member 152 and actuator member operative coupling member 154 are also shown in FIG. 5A. In FIG. 5A, coupling member 152 is shown coupled to strap 156 by adjustable closure 158, which in the illustration comprises a presently preferred embodiment of this invention, a Velcro® closure, but which may be any suitable adjustable closure. It is understood that either or both coupling members 152 and 154 may be coupled to strap 156 by an adjustable closure, which closure may be the same, e.g. both Velcro®, or they may different. Or one closure may be adjustable and the other closure may be a permanent non-adjustable closure.

Figure 5B:
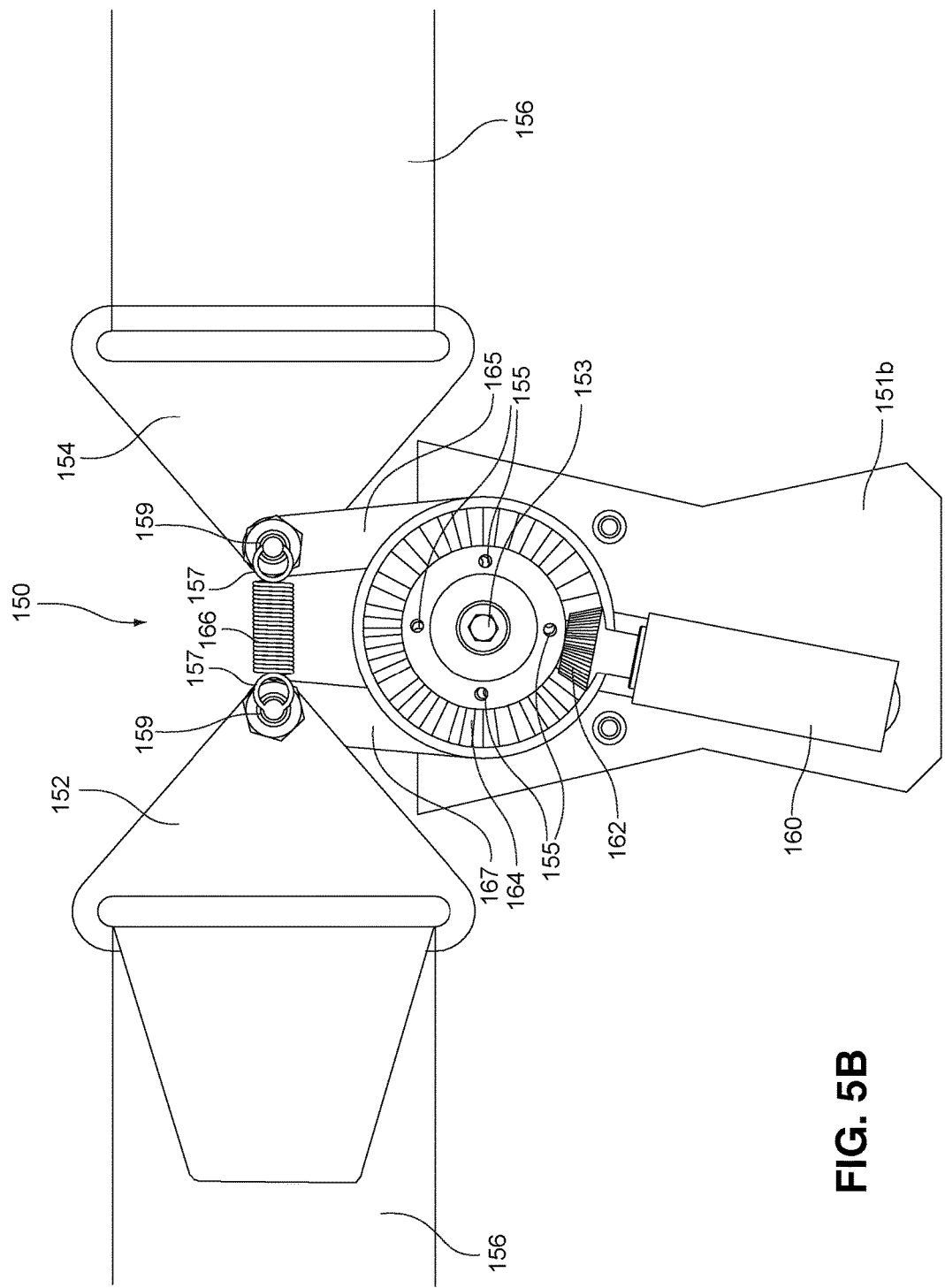
FIG. 5B is a view of the device of FIG. 5A with a top portion of the protective cover removed and the spring in its relaxed position.

FIG. 5B illustrates device 150 with front cover 151a removed and back cover 151b in place. Electrical generator 160 is coupled to support member 167 by fasteners (not shown). The fasteners may be of any suitable type such as, without limitation, screws or nuts and bolts. Two or more fasteners are used to immovably couple electrical generator 160 for support member 167. Electrical generator 160 is also operatively coupled to actuator 165 by a step-up gear assembly comprising bevel gear 162 and flat gear 164. By "step-up" is meant that the gears are selected such that linear movement of actuator 165 is translated to a greater linear movement of flat gear 162, which, in turn causes enhanced movement in the elements of electrical generator 160 than would otherwise be expected when compared to the linear movement of the actuator. Flat gear 162 is coupled to actuator 165 by two or more fasteners, which may be any matter of suitable fastener such as screws or pins. Shown are pins 155. A separator member may optionally be positioned between flat gear 162 and actuator 165 with the fasteners passing through the member. While FIG. 5B illustrates a bevel gear assembly to translate actuator 165 movement to electrical generator 160, it is understood that any suitable type of step-up movement translating device may be used. In FIG. 5B, spring 166 is shown coupled to actuator member operative coupling device 154 at one end and to support member operative coupling device 152 the other end. Spring 166 is coupled to actuator operative support member 154 and support member operative coupling member 152 by spring end members 157, which are passed through holes in pins 159. In FIG. 5B, spring 166 is shown in its relaxed state, which is the configuration it assumes when the expandable/contractable portion of the living organism around which strap 156 is snugly wrapped is in its relaxed, i.e., contracted state. Actuator 165 and support member 167 are operatively coupled to one another by virtue of their being rotatably mounted on axle 153. They are held in place on axle by axle end pieces (not shown) that have a larger diameter than the axle itself.

Figure 5C:
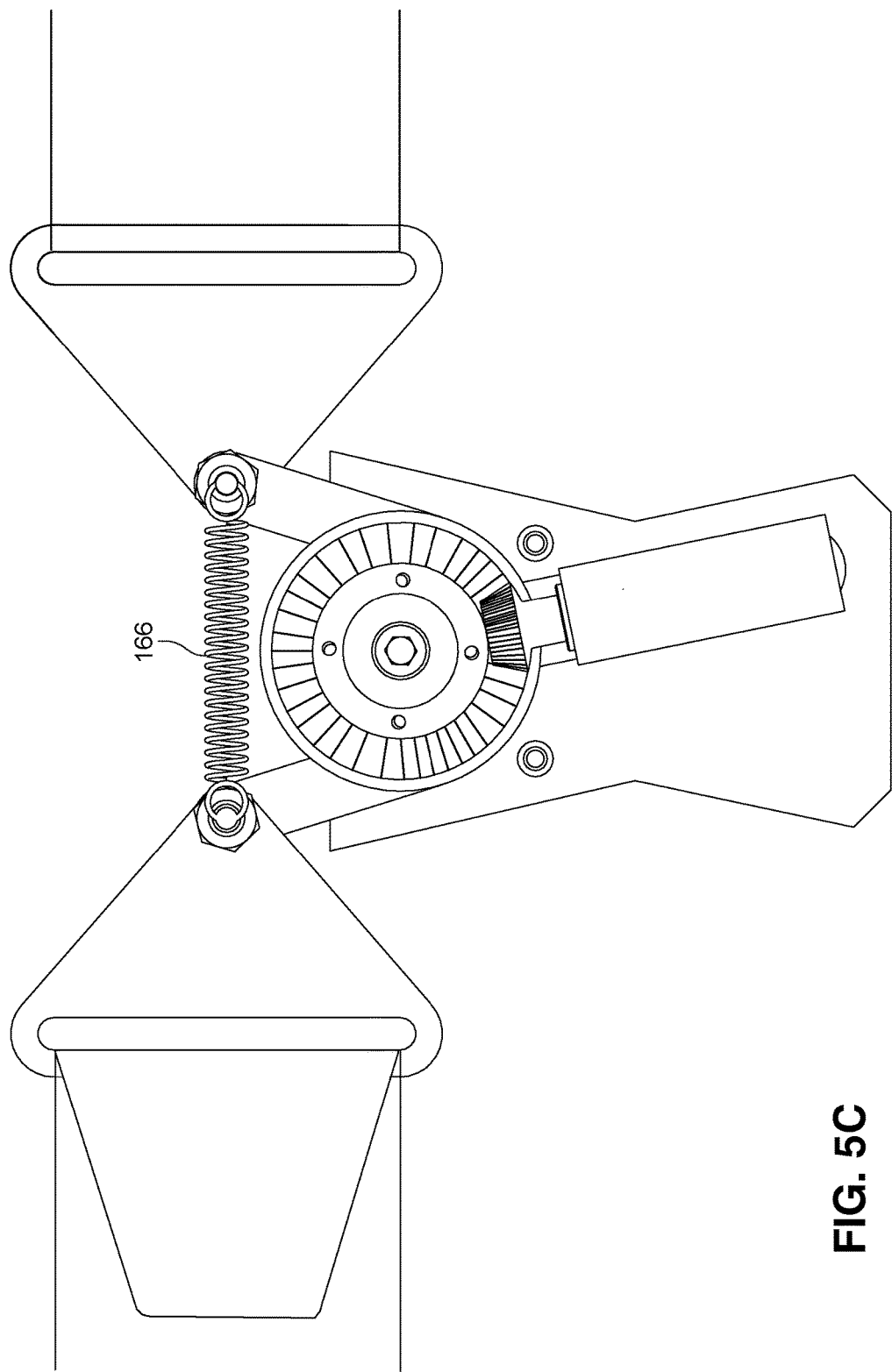
FIG. 5C is a view of the device of FIG. 5A with the top portion of the protective cover removed and the spring in its extended position.

When the portion of the living organism expands, spring 166 is stretched to its elongated state, as shown in FIG. 5C. When the living organism relaxes, spring 166 contracts to its rest state pulling actuator 166 back with it in preparation for the next operational cycle of device 150.

Figure 5D:
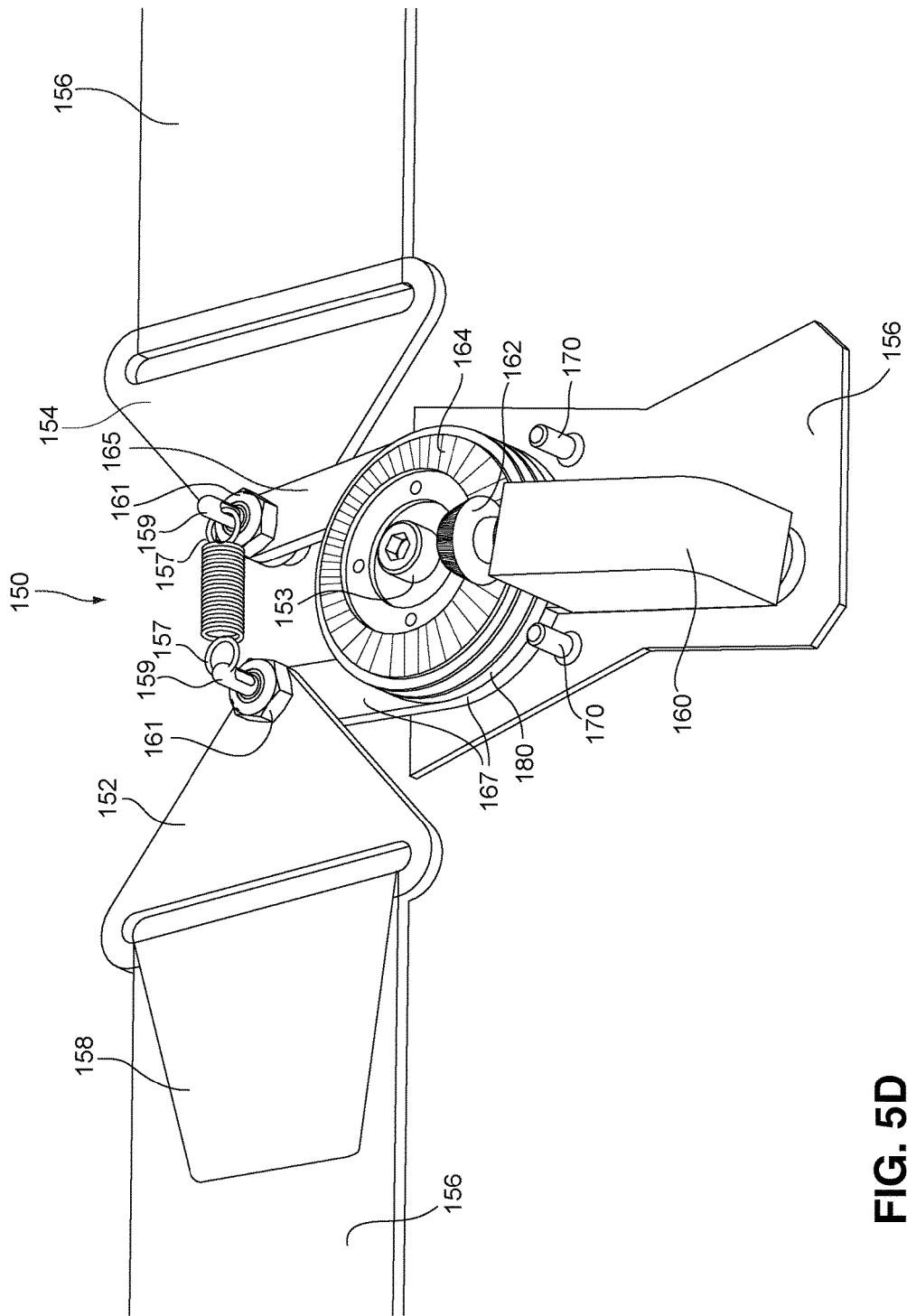
FIG. 5D is an isomeric view of the device of FIG. 5A.

FIG. 5D is an isometric view of device 150. Electrical generator 160 is coupled to support member 167. Electrical generator 160 is shown coupled to bevel gear 162. Bevel gear 162 is meshed with flat gear 164, which in turn is coupled directly or indirectly via one or more separation spacers to actuator 165. Support member 167 is coupled to support member operative coupling member 152 which it turn is to strap 156 by adjustable closure 158, preferably at present, a Velcro® closure. Fastener portions 170 on back cover 151b are used to fasten front plate 151a to back plate 151b. These fasteners may be of any suitable type such as, without limitation, wherein fastener portions 170 comprise cylindrical elements with central holes into which pins (not shown) located on front cover 151a are inserted and held in place by frictional force. One end of axle 153 is shown in FIG. 5D. Back cover 151b, actuator member 165 and support member 167 are all rotatably mounted on axle 153. While actuator member 165 and support member 167 may be in direct contact with one another on axle 153, the fact that actuator member 165 must be capable of rotating independently of support member 167, renders it presently preferable to rotatably mount washer 180 on axle 153 between actuator member 165 and support member 167 so as to present less frictional resistance to rotation of actuator member 165. Spring 166 is shown operatively coupled to actuator 154 and support member 152 by pins 159 through holes in which are passed spring end members 157. Pins 159 comprise a threaded portion (not shown) on which nuts 161 are placed to hold the pins in place on actuator operative coupling member 154 and support member operative coupling member 152.

Figure 5E:
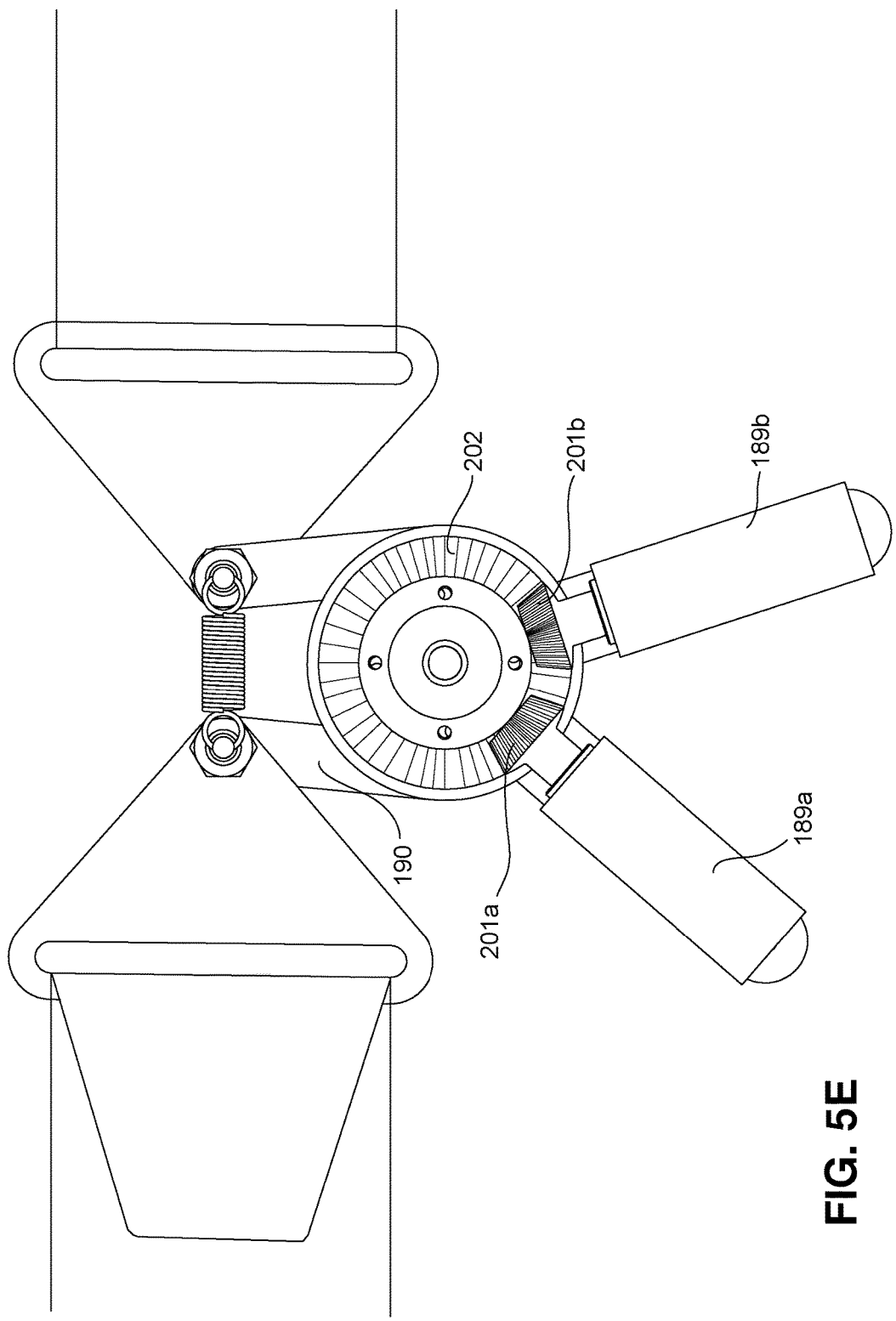
FIG. 5E is shows an embodiment of a device this invention comprising two electric generators coupled to the same device.

FIG. 5E illustrates an additional embodiment of this invention. In FIG. 5E two electrical generators, 189a and 189b are mounted on support member 190. Both electrical generators comprise bevel gears, 201a and 201b, which in turn are both meshed with flat gear 202. The result is that movement of an actuator operatively causes movement in both electrical generators resulting in the generator of essentially twice the electricity produced by a single electrical generator. It is anticipated that even more electrical generators may be added to a device of this invention, limited only by, without limitation, size, bulk, weight and production by the expandable/contractable portion of sufficient kinetic energy to operate the device.

Figure 5F:
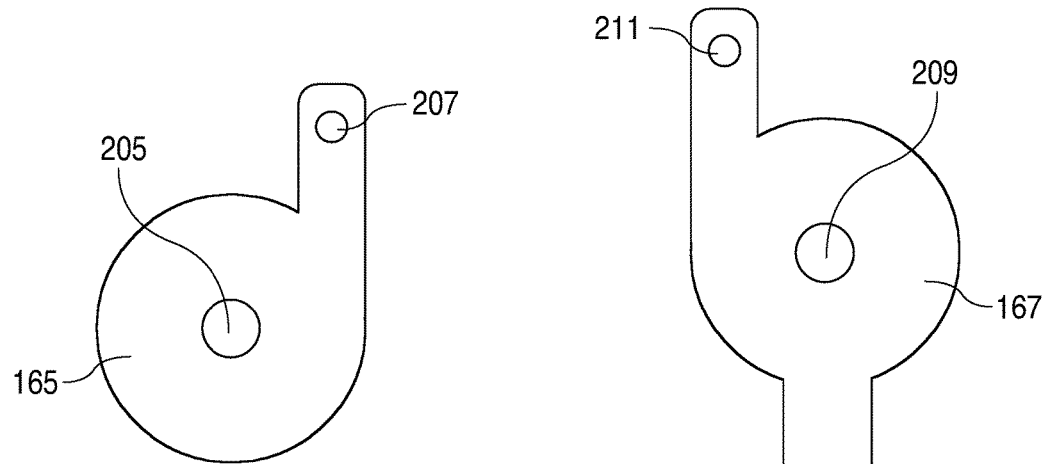
FIG. 5F shows an actuator member of a device of this invention.

FIG. 5F shows actuator 165 with central hole 205 by means of which actuator 165 is mounted on axle 153 and hole 207 through which pin 159 is passed to couple actuator 165 to actuator operative coupling member 154.

Figure 5G:
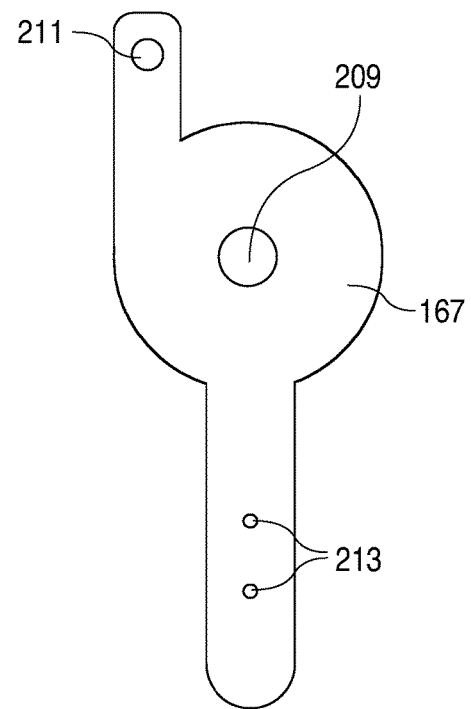
FIG. 5G shows a support member of a device of this invention.

FIG. 5G shows support member 167 with central hole 209 by means of which support member 167 is mounted on axle 153, hole 211 through which pin 159 passes to couple support member 167 to support member operative coupling member 152 and holes 213 by means of which electrical generator 160 is coupled to support member 167.

Figure 5H:
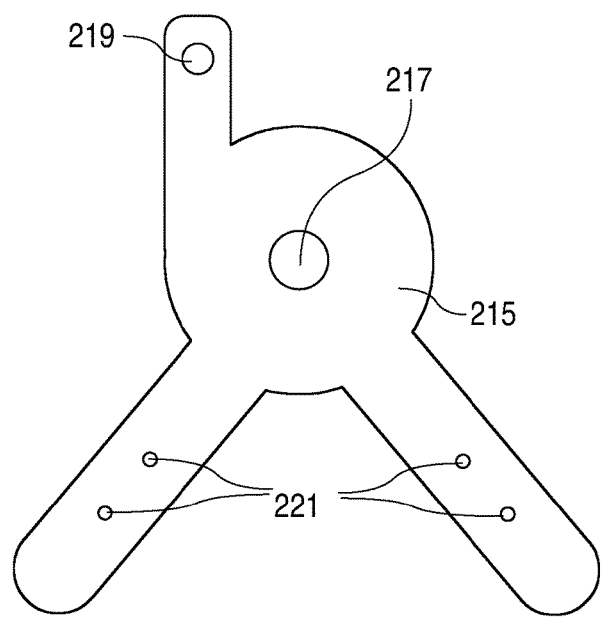
FIG. 5H shows a support member of a device of this invention that comprises two electrical generators coupled to the same device.

FIG. 5H shows support member 215 with central hole 217 by means of which support member 215 is mounted on axle 153, hole 219 through which pin 159 passes to couple support member 215 to support member operative coupling member 152 and holes 221 by means of which electrical generators 189a and 189b are coupled to support member 215.

While the above description is directed to specific embodiments of this invention, it is understood that those skilled in the art will be able to visualize other configurations of the elements of the invention as well as additional elements. Those configurations and additional elements, so long as they do not alter the fundamental workings of the embodiments herein are within the scope of this invention.

What is claimed is:

1. A device for converting kinetic energy generated by an expandable/contractable element of a living organism to electrical energy, comprising:
   a support member;
   a first gear operatively coupled to the support member such that the first gear and the support member rotate together in a first direction about an axis;
   an electrical generator operatively coupled to the first gear;
   an actuator member;
   a second gear engaged with the first gear, the second gear coupled to the actuator member such that the actuator member and the second gear rotate together in a second direction about the axis, the second direction being opposite the first direction;

a spring operatively coupled to the actuator member and to the support member;

a flexible non-elastic strap having a proximal end and a distal end, the proximal end being operatively coupled to the actuator member and the distal end being operatively coupled to the support member;

wherein the actuator member is rigid.

2. The device of claim 1, further comprising a protective case.

3. The device of claim 1, comprising one or more power outlet ports.

4. The device of claim 3, wherein one or more of the power outlet ports comprises(s) USB ports.

5. The device of claim 1, wherein the flexible non-elastic strap fits snugly around the expandable/contractable element of the living organism when in the contracted state.

6. The device of claim 5, wherein the living organism comprises a mammal.

7. The device of claim 6, wherein the mammal is a human being.

8. The device of claim 7, wherein the expandable/contractable portion of the human being is the chest.

9. The device of claim 8, wherein a resistance of about 1 lb. to about 10 lbs. is generated at the chest at full expansion of the device due to subject inspiration.

10. The device of claim 1, wherein the electrical generator is electrically coupled to an onboard capacitor.

11. The device of claim 1, wherein the electrical generator is electrically coupled to an onboard battery.

12. The device of claim 1, wherein the device comprises two or more individual devices coupled together either in parallel or in series.

13. The device of claim 1, wherein the device comprises two or more electrical generators, each electrical generator paired with one of two or more first gears to which the generator is operatively coupled, and each of the first gears is operatively coupled to the support member, such that the first gears and the support member rotate together in the first direction about the axis, and each of the two or more first gears are engaged with the second gear.

14. The device of claim 1, wherein the first gear is a bevel gear, and the second gear is a flat gear comprising gear teeth arranged on a plane.

15. The device of claim 14, wherein the device comprises a step-up gear assembly comprising the bevel gear and the flat gear.

16. The device of claim 1, further comprising an axle, wherein the first gear and the support member rotate together in the first direction around the axle, and the actuator member and the second gear rotate together in the second direction around the axle.

17. The device of claim 1, wherein the spring is operatively coupled to an actuator member operative coupling device and a support member operative coupling device; and the support member is coupled to the proximal end of the flexible non-elastic strap by the support member operative coupling device and the actuator member is operatively coupled to the distal end of the flexible non-elastic strap by the actuator member operative coupling device.

18. The device of claim 17, where the support member operative coupling device, the actuator member operative coupling device, or both, are coupled to the flexible non-elastic strap by an adjustable closure.

* * * * *